United States Patent [19]

Iwata

[11] Patent Number: 4,501,179
[45] Date of Patent: Feb. 26, 1985

[54] COMPOUND DIE ASSEMBLY

[75] Inventor: Satoshi Iwata, Tokyo, Japan

[73] Assignee: Tetsutaro Iwata, Japan

[21] Appl. No.: 415,978

[22] Filed: Sep. 8, 1982

[51] Int. Cl.³ .............................................. B26F 1/14
[52] U.S. Cl. ...................................... 83/124; 83/139; 83/167; 83/620; 83/698
[58] Field of Search ................. 83/698, 700, 685–691, 83/139, 142, 637, 620, 162, 621, 165, 167

[56] References Cited

U.S. PATENT DOCUMENTS

| | | | |
|---|---|---|---|
| 2,331,059 | 10/1943 | Tauser | 83/139 |
| 3,211,035 | 10/1965 | Whistler | 83/139 |
| 3,602,079 | 8/1971 | Carlson | 83/637 |
| 3,730,039 | 5/1973 | Fedrigo | 83/637 |
| 3,742,797 | 7/1973 | Vecchi | 83/637 |
| 3,752,028 | 8/1973 | Waizmann | 83/698 |
| 3,848,452 | 11/1974 | Gargrave | 83/637 |
| 4,104,941 | 8/1978 | Krueger | 83/637 |
| 4,143,574 | 3/1979 | Ryser | 83/698 |

Primary Examiner—James M. Meister
Assistant Examiner—J. L. Knoble
Attorney, Agent, or Firm—Carothers & Carothers

[57] ABSTRACT

A compound die assembly adapted to produce large-sized parts having a plurality of holes, complicated holes and/or lengthy holes wherein a blanking die (103) and a blanking punch (203) are made by wire-cut electro-discharge machining and are directly fixed onto a punch holder (101) and a die holder (201), respectively, a knockout plate (109) and a stripper plate (204) are also made by wire-cut electro-discharge machining and are fixed by hanger bolts onto the punch holder and the die holder through polyurethane rubbers (111, 206), respectively. Guide posts (30) are fixed to the punch holder and extends through the die holder downwardly. A mount (40) to be fixed onto the press bolster has a flat top surface on which the die holder is fixedly mounted and has a plurality of guide-post-receiving holes (401) in which coil springs (402) are contained to raise the guide posts received together with the punch holder. A plurality of load-supporting elements (50) are fixed onto the bottom surface of the die holder near slug clearance holes thereof.

7 Claims, 11 Drawing Figures

COMPOUND DIE ASSEMBLY

BACKGROUND OF THE INVENTION

This invention relates to dies for shearing in stamping, and more particularly, to compound die assemblies for performing blanking and piercing at a same press stroke.

Generally speaking, shearing in use of a compound die assembly is employed for high production of small-sized precision parts of metal such as steel, aluminum and others, paper or other materials, because it can readily produce a large number of parts with high dimensional accuracy without dimensional distribution. However, in order to insure the high dimensional accuracy of parts produced, it is required to make dies at high dimensional accuracy. Therefore, cost of the die is quite high so that the stamping in use of the compound die assembly is unsuitable for low production of parts of various shapes.

If the compound die assembly is used for making large-sized parts, weights and size of the die are necessarily increased and therefore, cost is also increased. Furthermore, the die assembly is suffered from difficulty and danger in installation on a press. In particular, it is accompanied with danger to fix a punch unit to the press ram, and there is required skill in die-height adjustment.

On the other hand, a die holder of the compound die assembly is provided with slug clearance holes in order to remove punched slugs, and the compound die assembly is mounted on the press so that the slug clearance holes are disposed over openings of a bolster and a bed of the press. However, in shearing a large-sized blank having holes distributed, there is a disadvantage that punched slugs corresponding to holes at peripheral portion of the blank do not drop into the bolster opening so that the slugs cannot be removed. In order to resolve such a disadvantage, it is thought to use parallel blocks beneath the die holder to form a space between the die holder and the press bolster in which punched slugs are accumulated. However, the central portion of the die holder is maintained unsupported. Therefore, there is a disadvantage that the die holder is bent by pressing force in blanking. Such a disadvantage is increased in blanking parts having many holes concentrated or crowded, complicated holes and/or lengthy slits. In order to resolve such a disadvantage, thickness of the die element and the die holder must be increased, but it results to increase of thickness and weight of the die assembly. Accordingly, the compound die assembly has been thought to be unsuitable for production of large-sized blanks.

SUMMARY OF THE INVENTION

It is an object of this invention to provide a compound die assembly which is simple and thick in construction, economical in cost, suitable for low production of parts, and/or suitable for production of large-sized blanks.

It is another object of this invention to provide a compound die assembly which is suitable for production of large-sized parts having holes crowded, complicated holes and/or lengthy slits, and which is able to readily remove punched slugs, to thereby realize the above-mentioned object.

It is still another object of this invention to provide a compound die assembly wherein the punch unit is not necessary to be fixed to the press ram so that mounting the die assembly onto the press is ready as well as the die-height adjustment is not required.

A compound die assembly according to this invention is one which comprises a punch unit including a punch holder, at least one punch element, a blanking die element, and a knockout plate; a die unit including a die holder, a blanking punch element corresponding to the blanking die element and having a die hole corresponding to the at least one punch element, and a stripper plate; and guide posts for maintaining operative vertical alignment of the punch unit and the die unit; wherein the top end portion of each guide post is fixed to the punch holder with the lower end portion thereof extending through each hole formed in the die holder, the blanking die and punch elements are respectively outer and inner pieces formed from a single plate by wire-cut electro-discharge machining (W.C.E.D.M.) and are directly fixed to the punch and die holders respectively, the knockout plate and the stripper plate are respectively inner and outer pieces formed from a single plate by W.C.E.D.M. and are elastically supported to the punch and die holders respectively. The assembly further comprises a mount to be removably mounted on the press bolster and having a flat top surface on which the die unit and punch unit are supported and a set of holes for receiving the lower ends of the guide posts, a plurality of load-supporting elements fixed near edges of slug clearance holes of the bottom surface of the die holder to form a slug-accumulating space between the die holder and the mount which communicates with the space surrounding the die holder, and clamping means for fixing the die holder onto the mount.

Another aspect of this invention is that springs are contained in respective holes of the mount to thereby urge the guide posts upwardly together with the punch unit.

Further objects, features and other aspects will be understood from the following detailed description of preferred embodiments of this invention referring to the accompanying drawings.

DETAILED DESCRIPTION OF PREFERRED EMBODIMENTS

Figure 1:
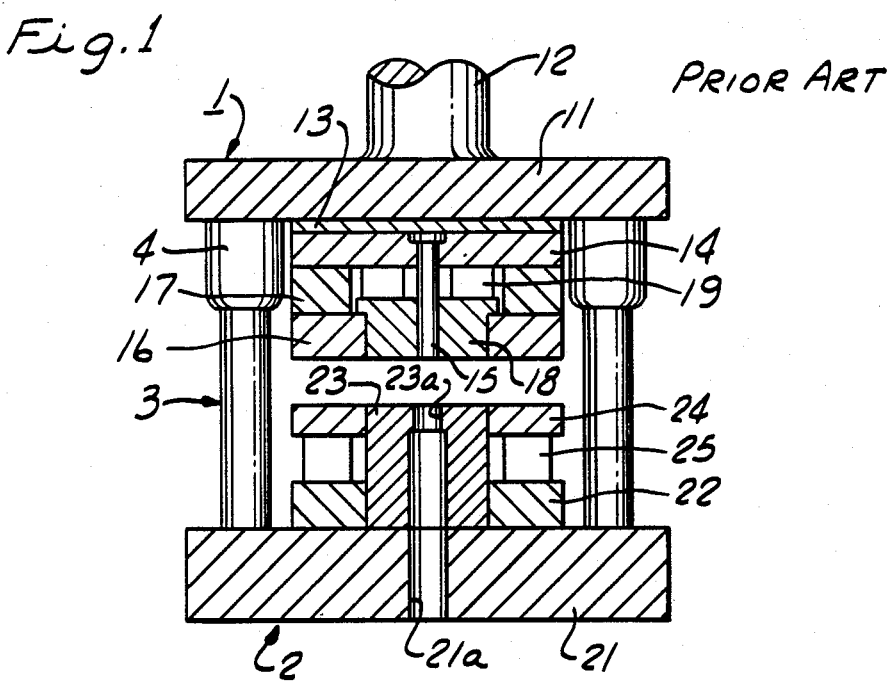
FIG. 1 is a sectional view of a known compound die assembly.

Prior to the description of embodiments of this invention, a known compound die assembly will be described referring to FIG. 1. The assembly shown includes a punch unit 1, a die unit 2, and a set of guide posts 3 for maintaining operative alignment of the punch unit and the die unit. Punch unit 1 is provided with a punch holder 11 which is formed with shank 12 for fixing the punch unit to a press ram (not shown). A backing plate 13 is secured onto the bottom surface of punch holder 11 by bolt means, and a punch plate 14 is also secured onto the bottom surface of backing plate 13 by bolt means. A piercing punch 15 is secured to punch plate 14 by being inserted into a hole of punch plate 14. Punch 15 is prevented from dropping down from punch plate 14 by engagement of its top collar with a shoulder of the hole of punch plate 14, and is also prevented from moving upwardly by engagement of its top surface with backing plate 13. A blanking die element 16 is supported to the bottom surface of punch plate 14 by bolt means with a spacer ring 17 therebetween. A knockout plate 18 is slidably fitted into the die hole of blanking die element 16, and punch 15 extends through knockout plate 18. One or more elastic members 19 of, for example, polyurethane rubber are disposed between knockout plate 18 and punch plate 14 to urge knockout plate 18 downwardly. Knockout plate 18 is also prevented from dropping down by engagement of its top outer flange with the upper edge of the die hole of blanking die element 16.

Die unit 2 is provided with a die holder 21 to be mounted on a press bolster (not shown), on which a die plate 22 is fixed. A blanking punch element 23 corresponding to blanking die element 16 and having a die hole 23a corresponding to punch 15 is fixed to die plate 22. A stripper plate 24 is slidably fitted onto blanking punch element 23 and is elastically supported on die plate 22 through one or more elastic members 25 of, for example, polyurethane rubber.

Die holder 21 is provided with a slug clearance hole 21a corresponding to die hole 23a of blanking punch element 23.

Guide posts 3 are fixed to die holder 21 and stand vertically thereon. Punch holder 11 is provided with guide bushings 4 for receiving top end portions of guide posts 3, and operative vertical alignment of punch unit 1 and die unit 2 is maintained by fitting guide posts 3 into guide bushings 4.

Figure 2:
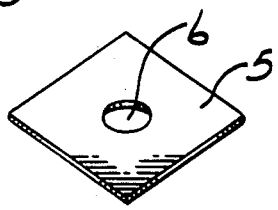
FIG. 2 is a perspective view of a blank produced by use of the compound die assembly as shown in FIG. 1.

The compound die assembly is mounted on a press by fixing punch unit 1 to a press ram through shank 12 and by clamping die holder 21 onto a press bolster by clamping means. When the press is operated after a work piece is provided onto die unit 2, a blank is obtained which has an outer shape corresponding to the outer shape of blanking punch element 23 and a hole pierced by punch element 15. The blank obtained by use of the compound die assembly of FIG. 1 is shown in FIG. 2. In the figure, 5 is the blank and 6 is a hole formed in the blank.

Thus, the use of compound die assembly enables to perform blanking and piercing at one time by one press stroke, and therefore, enables to produce a lot of blanks having a hole without dimensional distribution. Accordingly, the compound die assembly is employed for production of small-sized precision parts.

Figure 3:
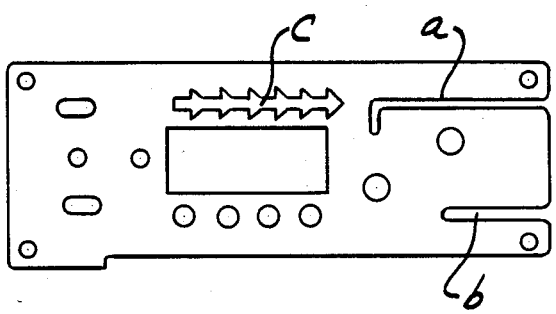
FIG. 3 is a plan view of an example of a large-sized precision blank.

However, for producing large-sized blanks having many holes, for example, as shown in FIG. 3, cost, volume and weight of the die assembly are necessarily increased. Moreover, removal of slugs is difficult and the blanking punch element and the die holder are suffered from bending, as described hereinbefore. Therefore, the compound die assembly is unsuitable for production of large sized parts, in particular, such as ones having one or more salts, complicated openings and/or crowded holes as shown at a, b, and c in FIG. 3.

This invention attempts to provide a compound die assembly which is suitable for production of large-sized parts having many holes, complicated holes and/or slits.

Figure 4:
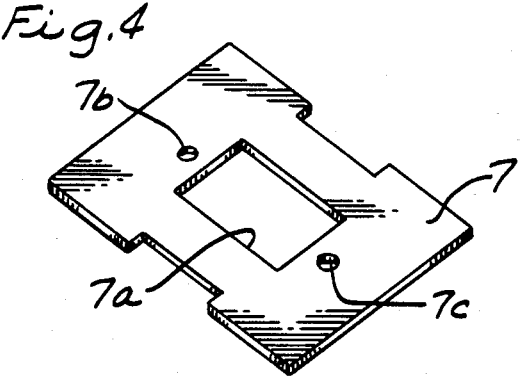
FIG. 4 is a perspective view of a blank produced by an embodiment of this invention.
Figure 5:
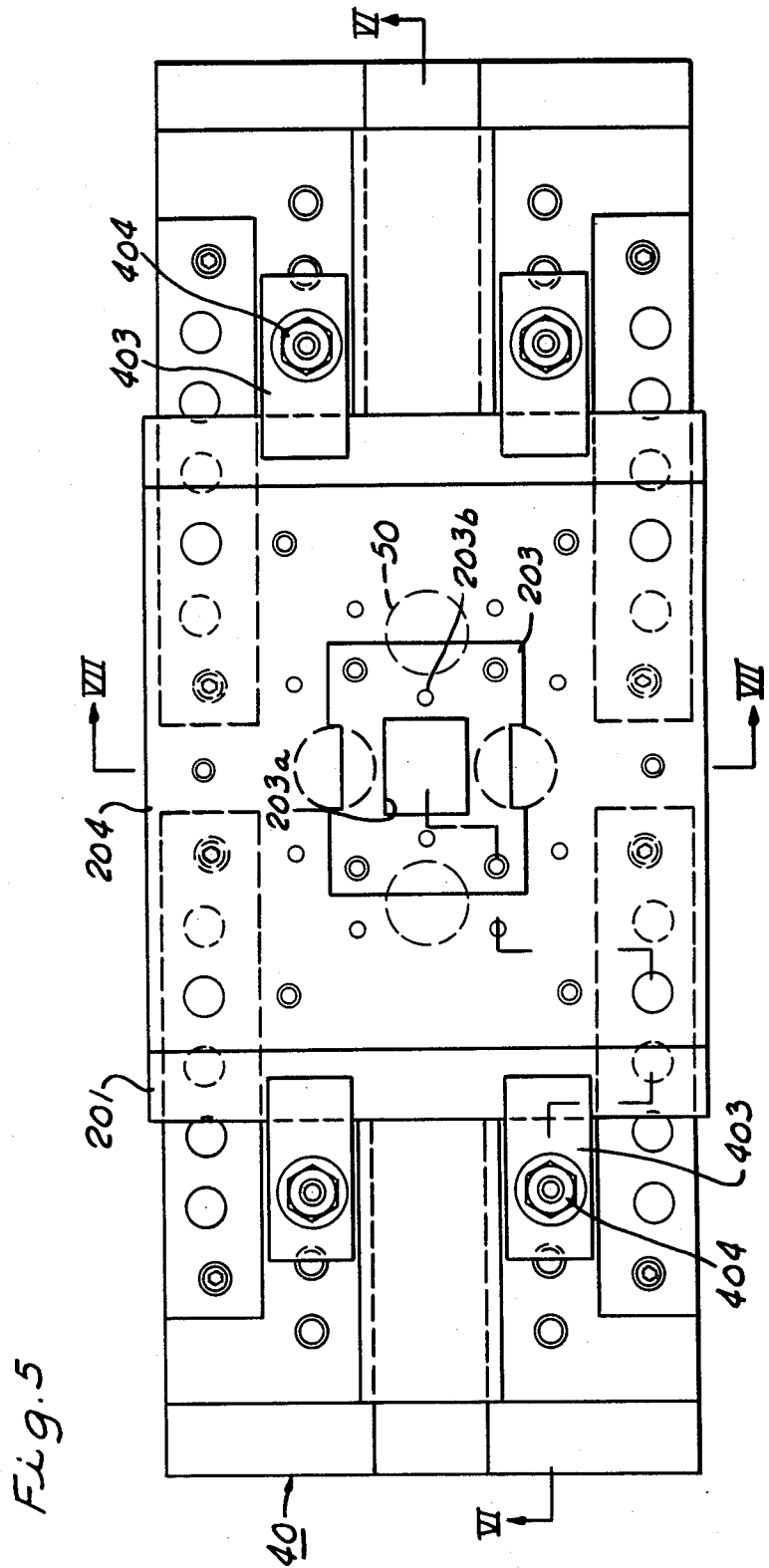
FIG. 5 is a plan view of a compound die assembly of an embodiment for producing the blank of FIG. 4 according to this invention, but the punch unit omitted.

An embodiment of this invention will be described below in connection with production of blanks as shown in FIG. 4 for simplification of the drawings. The blank 7 has a square hole 7a and two small circular holes 7b and 7c.

Referring to FIGS. 5–11, the embodiment shown is similar to the known compound die assembly in that it has a punch unit 10, die unit 20 and guide posts 30, but is quite different from the latter in construction of those units and in that the former is provided with a mount 40 and a plurality of load-supporting elements 50.

Figure 6:
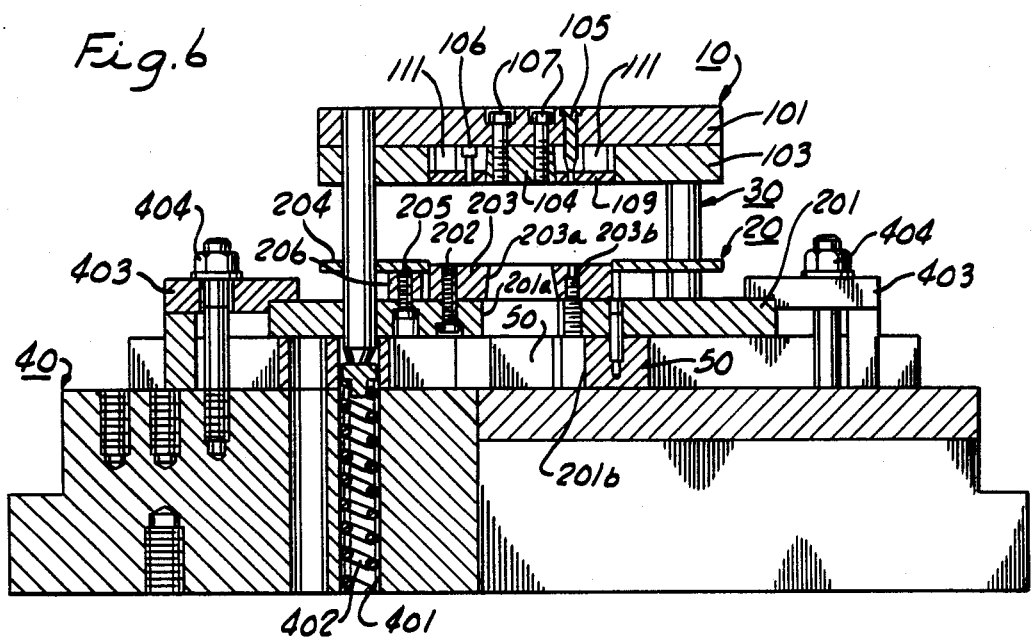
FIG. 6 is a sectional view of the embodiment taken along the line VI—VI in FIG. 5.
Figure 7:
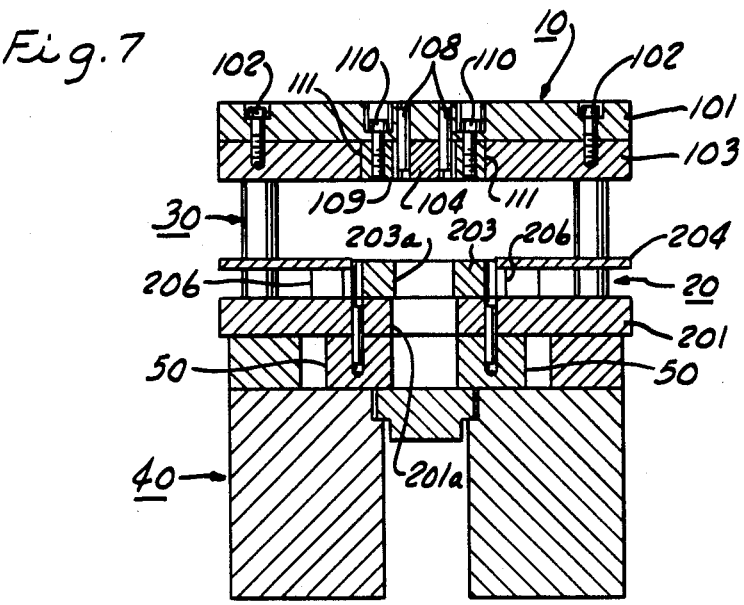
FIG. 7 is a sectional view of the embodiment taken along a line VII—VII in FIG. 5.
Figure 8:
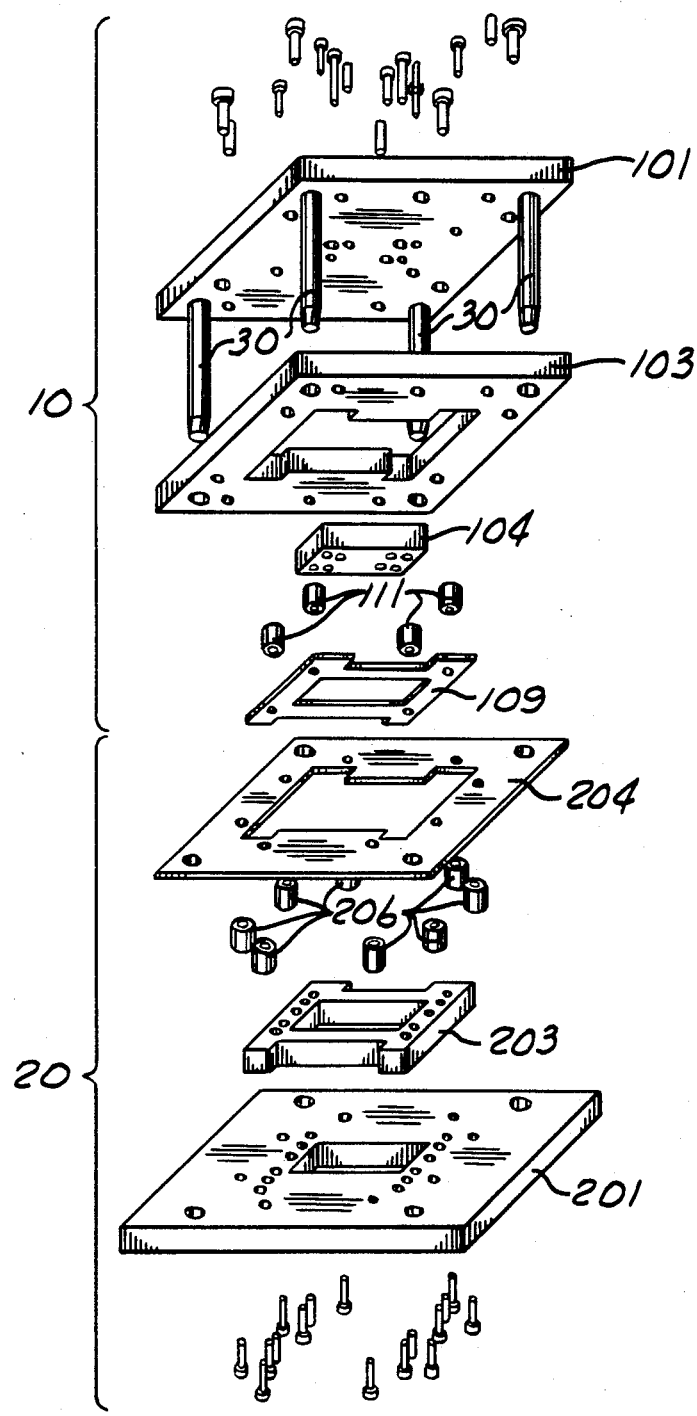
FIG. 8 is a disassembled perspective view of the punch unit and the die unit.

Punch unit 10 includes a punch holder 101 and a blanking die element 103 which is directly fixed onto the bottom surface of punch holder 101 by bolt means 102. Blanking die element 103 has a die hole corresponding to the outer shape of the desired blank. Punch elements 104–106 are disposed in the die hole of blanking die element 103. In this embodiment, punch 104 is for forming square hole 7a of the blank of FIG. 4, and will be referred to as an inner blanking punch element. Punches 105 and 106 are for piercing holes 7b and 7c of the blank in FIG. 4. Inner blanking punch element 104 is fixed to punch holder 101 by bolt means 107 and pins 108. Piercing punch elements 105 and 106 are secured to punch holder 101 by engagement of their top flange portions with shoulder portions of punch-receiving holes of punch holder 101, as best shown in FIG. 6. A knockout plate 109, which has an outer shape corresponding to the die hole of blanking die element 103 and holes corresponding to punches 104–105, is fitted in the die hole of blanking die element 103, and is supported to punch holder 101 by hanger bolts 110. One or more elastic members 111 of, for example, polyurethane rubber are disposed between knockout plate 109 and punch holder 101 so that knockout plate 109 can elastically sink in the die hole of blanking die element 103. Elastic members 111 are formed in a ring and are fixed to punch holder by hanger bolts 110 and/or screws.

Die unit 20 is provided with a die holder 201 and a die element 203 which is directly fixed onto die holder 201 by bolt means 202. Die element 203 has an outer shape corresponding to the die hole of blanking die element 103 and serves as a blanking punch element. Die element 203 is also provided with die holes 203a and 203b corresponding to punches 104–106. A stripper plate 204 having a hole corresponding to the die hole of blanking die element 103 is fitted onto die element 203, and is supported to die holder 201 by a hanger bolts 205. Elastic members 206 of, for example, polyurethane rubber are disposed between stripper plate 204 and die holder 201 so that stripper plate 204 can elastically sink from the top surface of die element 203. Die holder 201 is formed with slug clearance holes 201a and 201b corresponding to die holes 203a and 203b.

Guide posts 30 are fixed to punch holder 101 at their top end portions and extend downwardly through blanking die element 103. The lower end portions of guide posts 30 project downwardly from die holder 201 after extending through stripper plate 204 and die holder 201.

Mount 40 for supporting punch unit 10 and die unit 20 is provided with a set of holes 401 for receiving the lower end portions of guide posts 30 in the flat surface. Coil springs 402 are contained within the holes 401. Therefore, upon being inserted into holes 401, the lower end portions of guide posts 30 are pushed up by springs 402, so that punch unit 10 is elastically supported in a condition raised from die unit 20.

Die unit 20 is fixed onto mount 40 by fittings 403 and bolt means 404.

Figure 9:
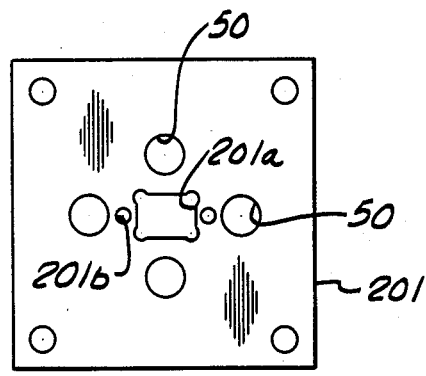
FIG. 9 is a bottom view of the die holder with load-supporting elements.

As best shown in FIG. 9, a plurality of load-supporting elements 50 are fixed near the opening edges of slug clearance holes 201a and 201b on the bottom surface of die holder 201. Therefore, a space is formed between the bottom surface of die holder 201 and mount 40. The space communicates with the surrounding space of the die holder and serves as accumulation of slugs.

Since load-supporting elements 50 are disposed at not peripheral edge portion but near the slug clearance holes, bending of die element 203 and die holder 201 is advantageously prevented even if holes to be pierced are slits, complicated, and/or crowded. Therefore, according to the arrangement of the compound die assembly, large-sized precision parts can be produced, and thickness of die holder 201 and die element 203 can be thin relatively.

In the above-described compound die assembly, blanking die and punch elements 103 and 203 are made from a sheet of plate by W.C.E.D.M. Referring to FIG. 11, it is known in the art to produce a die or a punch by the W.C.E.D.M., or by moving a wire 70 along an outer contour of a desired blank with establishment of electric spark between a work plate 60 and wire of, such as, phosphor bronze 70. If wire 70 is inclined to form a tapered section, the separated inner and outer pieces 601 and 602 can be used as a punch and a die, respectively, so that a set of punch and die can be produced by one cutting operation. In this connection, the wire-inclination angle $\theta$ must be selected in consideration of the thickness of the work plate 60 so as to make a suitable clearance l between tips of the punch 601 and die 602. Die 103 and punch 203 in the embodiment of FIGS. 5-10 are made by the process. According to the process, fittings of resultant punch and die is accurate in comparison with ones separately manufactured, and the working time is reduced.

Further, one or more piercing die holes are also able to be formed in the resultant blanking punch element (601 in FIG. 11) by a similar W.C.E.D.M. process, and the separated pieces can be also used as punch elements. In FIGS. 5-8, inner blanking punch element 104 is made by the process, but the other punch elements 105 and 106 are formed separately.

Knockout plate 109 and stripper plate 204 in the embodiment of FIGS. 5-8 are also made by the similar W.C.E.D.M. process but with wire 70 being not inclined.

In use of the above-described compound die assembly, mount 40 is disposed on a press bolster and is firmly fixed thereto by any suitable clamping means. Then, die unit 20 is fixed onto mount 40 by fittings and bolt means 403 and 404 after inserting coil springs 402 in holes 401 of mount 40. Thereafter, punch unit 10 is installed by inserting guide posts 30 into holes 401 of mount 40 through guide-receiving holes of stripper plate 204 and die holder 201. Thus, installation of the compound die assembly onto the press is completed. In the condition, when a work plate is put on die unit 20 and the press is operated, press ram moves downwardly to push down punch unit 10 against coil spring 402. Thus, a blank as shown in FIG. 4 is punched out. When press ram moves upwardly, punch unit 10 is pushed up by coil spring 402. Therefore, the punched out blank can be picked up and the assembly is restored to its initial condition. Production of blanks are subsequently performed in a similar manner. Slugs are accumulated on mount 40, but they can be removed through gaps between load-supporting elements 50 at desired times.

As described above, punch unit 10 is raised by coil springs 402 to form a space between punch unit 10 and die unit 20 in which the work plate is disposed, so that punch unit 10 is not required to be fixed to the press ram. Therefore, installation of the die assembly onto the press is quite simple and ready, and no die-height adjustment is also required.

Punch elements 105 and 106 are prevented from upwardly slipping out of punch holder 101 by engagement of their top surfaces with the bottom surface of the press ram. However, if there are openings and/or depressions in the press ram surface, a flat plate may be disposed on the top surface of punch holder 101. Punch unit 10 may be fixed to the press ram if it is desired, and coil springs 402 are not necessary in that case.

Figure 10:
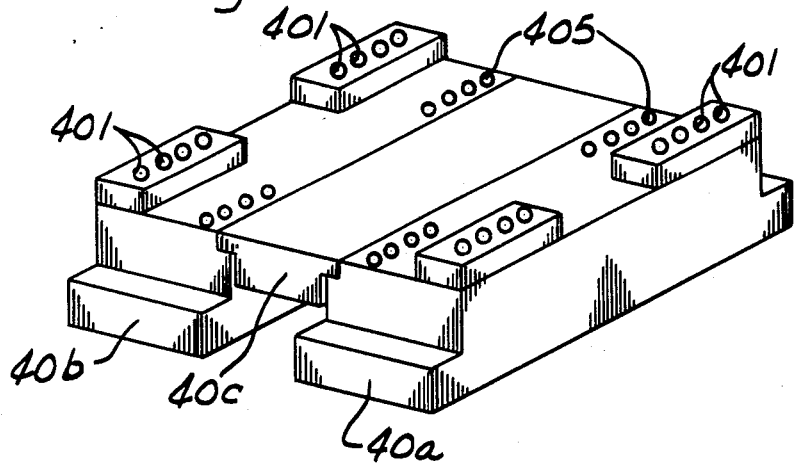
FIG. 10 is a perspective view of the mount.
Figure 11:
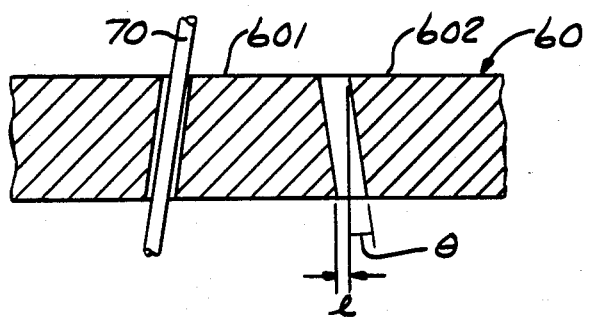
FIG. 11 is a view for illustrating a process for making a punch element and a die element by the wire-cut electro-discharge machining.

As best shown in FIG. 10, mount 40 may be provided with a plurality of guide-post-receiving holes 401 per one guide post, so that mount 40 can be used for different punch and die units without replacement. In that case, coil springs 402 are required to be displaced in new guide-post-receiving holes. Furthermore, mount 40 may be formed by three blocks 40a, 40b and 40c as shown in FIG. 9, with guide-post-receiving holes formed in two blocks 40a and 40b on the opposite sides, with the central block 40c being replaceable by different ones. In that arrangement, the mount can be used for supporting various punch and die units.

In FIG. 10, 405 represents screw holes for receiving bolts 404 for fixing die unit 20.

As known in the prior art, the blanking die element, punch elements, die or blanking punch element, knockout plate and stripper plate are made of alloy tool steel.

As each load-supporting element, not only a disk but also blocks of the other various shapes such as cube, rectangle or others may be used. The load-supporting element is also made of alloy tool steel.

This invention has been described in detail in connection with an embodiment producing blanks of a comparatively simple shape as shown in FIG. 4, but can be adapted to produce the other complicated blanks, for example, as shown in FIG. 3.

What is claimed is:

1. In a compound die assembly including an upper punch unit having a punch holder, at least one punch element, a blanking die element, and a knockout plate; a lower die unit having a die holder, a blanking punch element corresponding to said blanking die element and having at least one die hole corresponding to said at least one punch element, said die holder having at least one slug clearance hole corresponding to said at least one die hole, and a stripper plate; and a guide post means for maintaining operative vertical alignment of said punch unit and said die unit; the improvement which comprises the top end portion of each guide post means being fixed to said punch holder with the lower end portion thereof extending through a respective hole formed in said die holder, said blanking die and punch elements being respectively outer and inner pieces formed from a single plate by wire-cut electro-discharge machining and being directly fixed to said punch and die holders respectively, said knockout plate and said stripper plate being respectively inner and outer pieces formed from a single plate by wire-cut electro-discharge machining and being elastically supported with respect to said punch and die holders respectively, a mount means to be removably mounted on a press bolster and having a flat top surface on which said die unit and punch unit are supported, said mount means having a set of holes for receiving the lower ends of said guide post means, a plurality of load-supporting elements being fixed to a bottom surface of said die holder and near the edge of said at least one slug clearance hole of said die holder to form a slug-accumulating space between said die holder and said mount means which communicates with an external space surrounding said die holder, and clamping means fixing said die holder onto said mount means.

2. The improvement as claimed in claim 1, which further comprises spring means contained in respective holes of said mount means to thereby urge said guide post means upwardly together with said punch unit.

3. The improvement as claimed in claim 2, wherein said mount means is provided with a plurality of sets of said guide-post receiving holes to be adapted to selectively support different die sets.

4. The improvement as claimed in claim 3, wherein said mount means comprises first and second block portions to be fixed onto the press bolster, and a third block portion which is supported on and between said first and second block portions, whereby said mount means may be adapted to support a different size of said die assembly by replacing said third block portion by a different size one.

5. The improvement as claimed in claim 1, wherein said knockout plate is supported to said punch holder by hanger-bolt means, and at least one elastic member is disposed between said punch holder and said knockout plate to urge said knockout plate downwardly.

6. The improvement as claimed in claim 1, wherein said stripper plate is supported to said die holder by hanger-bolt means, at least one elastic member disposed between said stripper plate and said die holder to urge said stripper plate upwardly.

7. The improvement as claimed in claim 5 or 6, wherein said elastic member means is made of polyurethane rubber.

* * * * *